Feb. 20, 1934.  B. P. COULSON, JR  1,948,370
ELASTIC FLUID GENERATOR
Filed Dec. 29, 1932
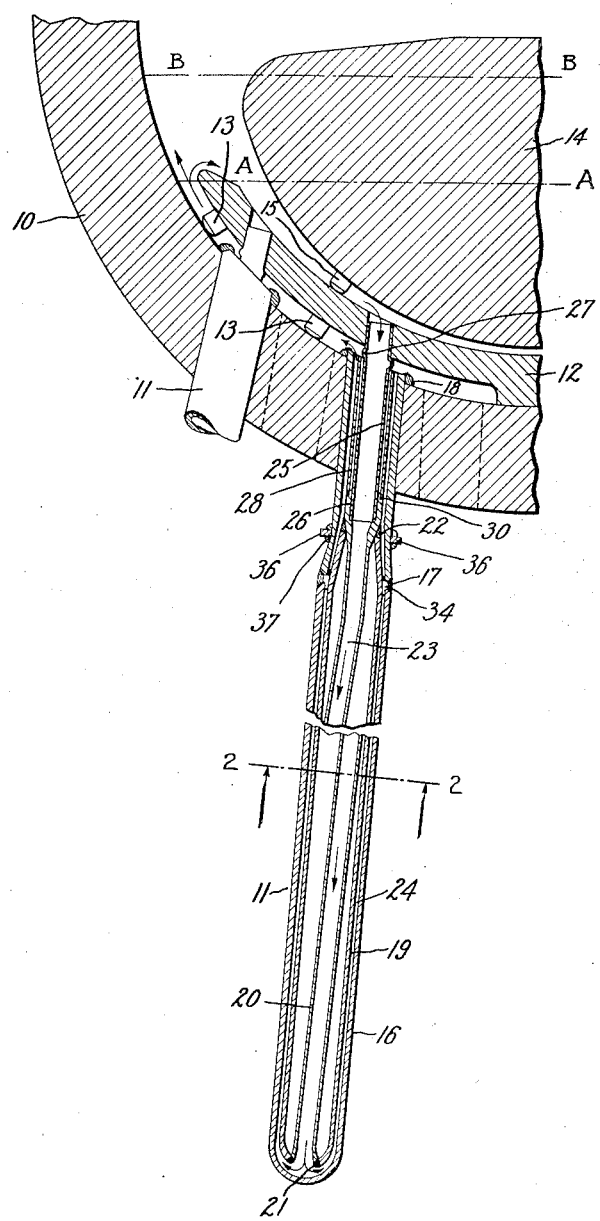
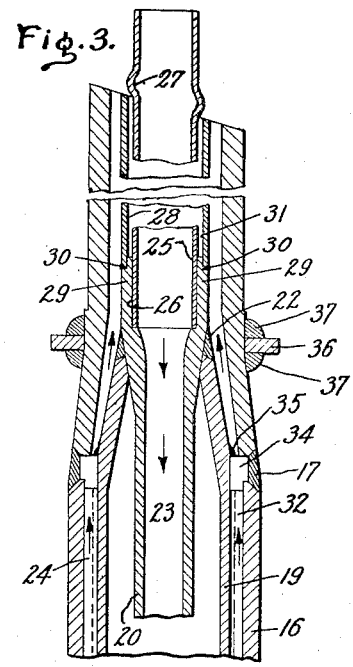
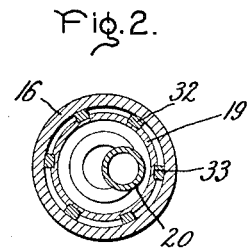
Inventor:
Bevis P. Coulson, Jr,
by Charles E. Tullar
His Attorney.

Patented Feb. 20, 1934

1,948,370

UNITED STATES PATENT OFFICE 1,948,370

ELASTIC FLUID GENERATOR

Bevis P. Coulson, Jr., Schenectady, N. Y., assignor to General Electric Company, a corporation of New York Application December 29, 1932
Serial No. 649,351

4 Claims. (Cl. 122—305)

The present invention relates to elastic fluid generators for heating and evaporating a liquid having a high specific weight, for instance, mercury. More specifically the invention relates to the kind of apparatus disclosed in my copending application, Serial No. 478,399, filed August 28, 1930.

The general object of the present invention is to provide an improved construction and arrangement of the boiler tubes whereby a rapid circulation of the fluid is obtained and leakage of one or more cores may be easily detected.

For a consideration of what I consider to be novel and my invention, attention is directed to the following description and the claims appended thereto in connection with the accompanying drawing.

In the drawing, Fig. 1 represents a portion of a sectional view of an elastic fluid generator embodying my invention; Fig. 2 is a cross section along lines 2—2 of Fig. 1; and Fig. 3 represents a portion of Fig. 1 on a larger scale.

Referring to the drawing, the elastic fluid generator comprises a container or drum 10 provided at its lower portion with a plurality of liquid circulating and evaporating tubes 11. Provided within the drum is a baffle plate 12 having a central portion engaging the wall of the drum and other portions spaced from the drum by knobs or spacers 13. To decrease the amount of liquid, such as mercury, for operating the generator, the filler block or blocks 14 are provided within the drum spaced from the baffle plate by knobs 15. The drum is filled with liquid which during cold condition has a level somewhat below the upper edge of the baffle plate as indicated by dash-dotted line A—A. During operation the liquid level rise above the upper edge of the baffle plate, as indicated by dash-dotted line B—B.

Referring now to the liquid evaporating and circulating tubes which form the subject matter of the present invention, each circulating tube comprises an outer or main tube 16 having a lower portion and an upper portion welded together as indicated at 17. The upper portion is necked-in as disclosed in my above-mentioned copending application to permit the provision of smaller holes in the wall of the drum to avoid excessive weakening of the latter. It must be kept in mind that each drum is provided with a hundred or more tubes. The upper end of the tube is welded to the drum as indicated at 18. Arranged within the tube is a core comprising an outer tubular member 19 and an inner tubular member 20. These members are united at their lower ends by a weld 21 and the upper end of the outer tube 19 which is reduced in diameter is welded to the inner tube, as shown at 22. The inner tube defines a passage 23 for receiving liquid from the boiler drum and the outer tubular member together with the outer or main tube define a space or passage 24 communicating with the liquid passage 23 for conducting the liquid and vapor back to the drum. During operation liquid flows down through the passage 23 and up through the vapor passage 24, heat being transmitted to the tube from a source, not shown.

In accordance with my invention, I provide a tubular member 25 held in a hole in the baffle plate 12 and having at its lower portion a loose fit with a recessed portion 26 of the core, in the present instance the inner tubular member 20 thereof. This arrangement permits relative movement between the core and the baffle plate. A portion 27 of the tubular member below the baffle plate is deformed to define knobs for preventing upward movement of the tubular member. Surrounding tubular member 25 is a sleeve 28 which has its lower end fastened to the upper end of the core. In the present instance I have shown this sleeve as being welded to a recessed portion 29 of the inner tubular member, the weld being indicated at 30. The upper end of the sleeve extends into the boiler drum. The sleeve 28 and the tubular member 25 together define a small clearance 31 which has a high resistance to the flow of fluid therethrough. This clearance which during operation is filled with fluid defines a hydraulic seal between the vapor passage and the liquid passage of the core. For the proper operation of the heating tubes it is necessary that vapor arising in the vapor space be prevented from flowing directly into the liquid space, that is, through the clearance defined by the loose fit between the tubular member 25 and the core. With this arrangement the vapor formed in the vapor space 24 of the core does not obstruct the flow of liquid through the liquid passage 23. From another viewpoint, the sleeve 28 forms an extension of the core reaching into the drum, whereas the tubular member 25 for supplying liquid from above the baffle plate to the liquid passage has a loose fit with a portion of the core near the lower end of the extension 28.

Another important feature of my invention is that the hermetically closed space defined by the two tubular members of the core is filled with a substance other than air which at the operating temperature of the boiler forms a gas of a heat-conductivity lower than that of air at this temperature. More specifically I provide a gas such as Toluol or Methane which can easily be detected in the boiler drum or in other apparatus connected thereto should leakage of a core occur. The low heat-conductivity of this gas minimizes the direct transmission of heat from the vapor space to the liquid space through said hermetically closed space, with the result of a great drop in temperature thus effecting a more rapid circulation of the fluid in the two passages.

In choosing a substance to be enclosed in the cores, it must be kept in mind that the substance must withstand the high operating temperatures of the boiler without decomposing. As to the amount of the substance to be enclosed in the cores, it is preferable to provide an amount sufficient to produce a pressure at the operating temperature of the tubes equal to or of the order of the pressure existing outside the cores. With this provision strains and stresses on the cores due to excessive pressure are eliminated.

The provision of a substance other than air in the hermetically closed spaces of the cores represents a simple and reliable means for detecting leakage of a core. During operation of the boiler, tests of the vapor generated therein will be made to ascertain whether one or more of the cores are leaking. These tests may be easily made by analyzing samples of the vapor produced in the drum to determine whether they contain the substance provided in the hermetically closed spaces of the cores. In case the cores are filled with carbon oxide or like substance which can be indicated directly by known instruments, I may connect such an instrument to the drum or an apparatus, for instance, a condenser communicated with the drum. Having established that one or more cores are leaking, any suitable method may be used to ascertain which of the individual cores are leaking.

The outer tubular member of the core is concentrically arranged with the outer or main tube. The position of the core is maintained by means of spacers 32 held in recesses 33 of the outer tubular member 19. Fastened to the upper ends of the spacers 32, preferably by butt-welding, are blocks 34 (Fig. 3) which are held between the lower and upper portions of the outer or main tube and welded to the outer tubular members 19, as shown at 35. A collar 36 is united with the upper portion of the main tube by means of a weld 37. This collar serves for supporting lagging or insulation to be provided on the drum.

During manufacture and assembly of this structure, I first unite the two tubular members defining the core and weld thereto the extension or sleeve 28. Thereafter the spacers 32 and blocks 34 are inserted in the recesses 33 of the outer tubular member and united with the main tube by the weld 17. This structure is then inserted in a hole of the drum and fastened thereto by the weld 18. After this baffle plate is inserted in the drum and the sleeve 25 is inserted in the upper end of the core.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In an elastic fluid generator the combination of a drum, a baffle plate in the drum, a depending tube fastened to the drum, a core within the tube having a liquid passage and defining with the tube a vapor passage communicating at its lower end with the liquid passage, a tubular member having a loose fit with an upper portion of the core for conducting liquid from above the baffle plate to the liquid passage, and a sleeve surrounding the tubular member with its lower end united with the upper end of the core for defining a hydraulic seal between the vapor passage and the liquid passage.

2. In an elastic fluid generator, the combination of a drum for containing liquid to be evaporated, a baffle plate in the drum, a depending tube fastened to the drum, a core within the tube having a liquid passage and defining with the tube a vapor passage communicating at its lower end with the liquid passage, the core having an extension reaching into the drum, and a tubular member concentrically arranged within the extension of the core for conducting liquid from above the baffle plate to the liquid passage, the extension of the core and the tubular member defining a hydraulic seal for preventing flow of vapor from the vapor passage into the liquid passage.

3. In an elastic fluid generator, the combination of a drum for containing fluid to be evaporated, a tube depending from the drum and being fastened to the drum, a core within the tube comprising an inner and outer tubular member united near their ends to define a hermetically sealed space, a substance other than air in said space, said substance having a heat conductivity at the operating temperature lower than that of air, and being detectable in the drum in case of leakage of the core, the inner tubular member defining a liquid passage, the outer tubular member and the tube defining a vapor passage communicating with the drum and the liquid passage, and means for conducting liquid from the drum to the passage.

4. In an elastic fluid generator, the combination of a drum containing liquid to be evaporated, a baffle plate in the drum concentrically arranged with a lower portion of the drum, a tube depending from and fastened to the drum, a core in the tube having a liquid passage and defining with the tube a vapor passage, spacers held in grooves of the core for positioning the core in the tube, a tubular member for conducting liquid from above the baffle plate to the passage, and a sleeve surrounding the tubular member and fastened to the core for increasing the resistance to flow of vapor from the vapor passage into the liquid passage.

BEVIS P. COULSON, Jr.